Jan. 19, 1943.  E. WILDHABER  2,308,734
METHOD OF RELIEF-GRINDING CUTTERS
Filed April 12, 1941  2 Sheets-Sheet 1

Inventor
ERNEST WILDHABER
By
*B. Schlesinger*
Attorney

Jan. 19, 1943.  E. WILDHABER  2,308,734
METHOD OF RELIEF-GRINDING CUTTERS
Filed April 12, 1941  2 Sheets-Sheet 2

Inventor
ERNEST WILDHABER
Attorney

Patented Jan. 19, 1943

2,308,734

UNITED STATES PATENT OFFICE 2,308,734

METHOD OF RELIEF-GRINDING CUTTERS

Ernest Wildhaber, Brighton, N. Y., assignor to Gleason Works, Rochester, N. Y., a corporation of New York Application April 12, 1941, Serial No. 388,229

8 Claims. (Cl. 51—288)

The present invention relates to the relief-grinding of face-mill gear cutter blades and particularly to relief-grinding blades of face-mill gear cutters which have profiles of varying inclination at different portions of the blade height to the axis of the cutter. In a still more specific aspect, the invention relates to the relief-grinding of blades of spherical type face-mill gear cutters.

One object of the invention is to provide a simple, practical, and more efficient method for relief-grinding blades of spherical and other types of face-mill gear cutters which have blade profiles of varying inclination to the cutter axis.

A further object of the invention is to provide a method for relief-grinding such blades by which both inside and outside surfaces of a complete set of blades may be relief-ground in a single setup and in a single operation.

Other objects of the invention will be apparent hereinafter from the specification and from the recital of the appended claims.

The present method is limited to the relief-grinding of the side surfaces of blades of inserted blade type cutters. The blades to be ground are mounted in a dummy head so that they are tilted forwardly out of cutting position by the amount of top clearance angle of the blades. The tips of the blades thus will all lie in a plane perpendicular to the axis of the dummy head. A pair of wheels are used whose profiles are dressed, respectively, to correspond to the inside and outside profile shapes of the blade surfaces to be relieved. The wheels are so mounted relative to the dummy head that the profiles of the wheels are inclined to the axis of the dummy head at angles corresponding to the inclination of the outside and inside surfaces of the blades. The relief-grinding operation is then effected by rotating the wheels on their axes while rotating the dummy head on its axis and while moving the wheels axially in time with the head rotation. The axial movement is a periodic reciprocatory movement effected once for each blade, and it serves to compensate for and to offset the variation in pressure angle of the blades from front to rear which would result if the blades were ground in the dummy head by simple rotation of the wheels and head on their respective axes.

With the method of the present invention, only one dummy head is required for a given cutter diameter. This dummy head, however, will be somewhat larger in diameter than the cutter diameter. Thus it has been found that the dummy head diameter for spherical cutter blades should be about 9% larger than the cutter diameter, if the usual top relief angle of 12° is employed on the blades. By using a dummy head of increased diameter, blades can be ground to correspond exactly to the desired cutter diameter without diameter error. Further than this, by use of the dummy head of larger diameter, it is possible to grind a complete set of blades in one operation, that is, all of the blades of a cutter can be mounted in the dummy head at one time. This means that only one setup is required. This applies to alternate blade cutters, and even to cutters with all outside or all inside blades. Aside from the saving in setup time that results, there is a further advantage attained, namely, the advantage in accuracy, for by grinding all the blades in one setup, the height is automatically bound to be the same on all blades.

Figure 3:
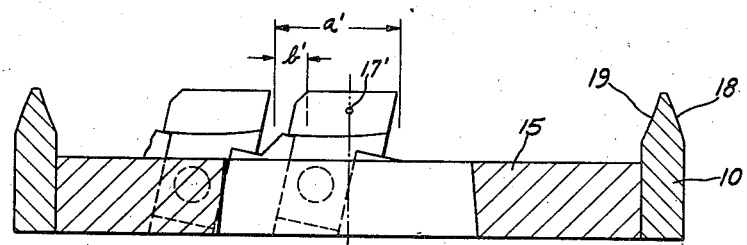
Figure 4:
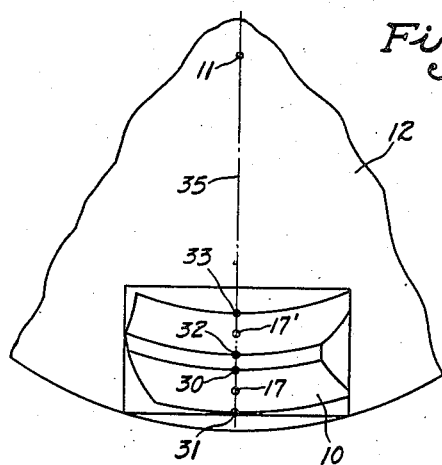
Figure 6:
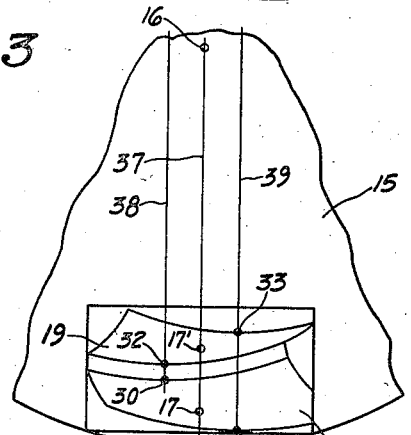
Figure 5:
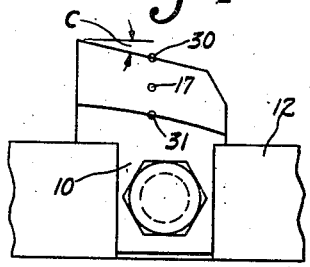
Figure 7:
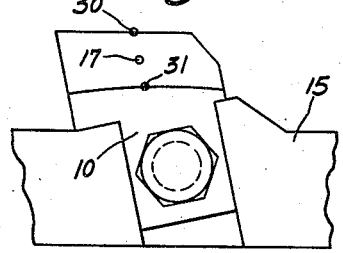
Figure 8:
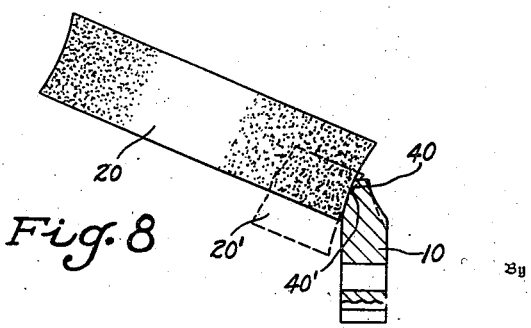

Fig. 3 is a transverse sectional view through the dummy head, showing further how the blades are mounted in this head for the relief-grinding operation; and Figs. 4 to 8 inclusive are diagrammatic views, showing the purpose of the correcting motion of the present invention, Figs. 4 and 5 showing the relationships which must exist when a blade is mounted in its own head, Figs. 6 and 7 showing the relationships which must exist when a blade is mounted in the dummy head and tilted out of actual cutting position in order to achieve the desired cutting relationships, and Fig. 8 showing how the axial motion of the grinding wheel serves to compensate for the change in position of the blade from its own head to the dummy head and to produce a pressure angle on the blade which will be substantially constant from front to rear when the blade is in cutting position.

In a standard face-mill gear cutter, the blades 10 are mounted to extend in the direction of the axis 11 of the cutter head, as illustrated in Figs. 4 and 5. As has already been indicated, in the relief-grinding of the side surfaces of these blades according to the present invention, the blades are mounted in a dummy head, such as denoted at 15 in Figs. 1 to 3 inclusive, 6 and 7, and they are tipped forward out of cutting position at an angle equal to the top relief angle C (Fig. 5) of the blades. When mounted in the dummy head, then, the tips of the blades will lie in a plane perpendicular to the axis 16 of the dummy head. Preferably the blades are so mounted in the dummy head as if tipped about a radial line 17—17'.

In the drawings, the invention has been illustrated particularly as applied to the relief grinding of blades of a spherical face-mill gear cutter. Such blades have outside surfaces 18 that are of convex profile shape and inside surfaces 19 that are of concave profile shape. For the grinding of the outside surfaces of the blades, a grinding wheel is preferably used, such as shown at 20, which is dressed to concave circular arcuate profile shape in an axial plane. For grinding the inside surfaces of the blades, a grinding wheel 21 is preferably used which is dressed to a convex circular arcuate profile shape in an axial plane. The grinding wheels are mounted so that their axes 22 and 23, respectively, lie in the same plane with the axis 16 of the dummy head.

For the relief-grinding of the side surfaces of the blades, the grinding wheels and the dummy head are rotated on their respective axes and in place of a relieving motion a correcting motion is employed. This correcting motion is produced by moving the grinding wheels 20 and 21 axially, as indicated by the arrows 24 and 25, respectively, in timed relation to the rotation of the dummy head 15 on its axis 16. The axial motion is a reciprocating motion and is effected once for each blade, that is, there is one cycle per blade. The axial motion is in one direction during the relief grinding of the side surface of a blade from front to rear, and then is reversed to return the grinding wheel to initial position ready for the grinding of the next blade.

The purpose and function of the correcting motion is to maintain the pressure angles of the inside and outside surfaces of the blades constant or substantially constant from front to rear, so that, after a blade is sharpened, the blade may cut the same tooth surface as when new. Were no correcting motion employed, and were relief-grinding effected simply by rotation of the grinding wheel and dummy head on their respective axes, the pressure angles of the inside and outside surfaces of the blades would vary from front to rear.

Figs. 4 and 5 show a cutter blade 10 mounted in its cutter head 12, that is, in a position as used for cutting. An axial plane 35 of the cutter intersects the blade in a line containing mean points 17 and points 30, 31 at the top and bottom, respectively, of the outside surface of the blade, and further in a line containing mean point 17' and points 32, 33 at the top and bottom, respectively, of the inside surface of the blade. When blades are relieved according to the process of the present invention, the outside and inside surfaces are helicoids. The helices through the end points 30, 31 and 32, 33 appear as circles centered at 11, in the view Fig. 4. The directions of said helices at said points are all parallel to each other in said view and perpendicular to radius 11—17.

Figs. 6 and 7 show the cutter blade as mounted in a dummy head for relieving. The blade is tipped forward at the top relief angle C (Fig. 5), as if tipped about a radial line passing through mean points 17, 17'. As shown exaggerated in Fig. 6, the top points 30, 32 are thereby moved forward of mean points 17, 17' and the bottom points 31, 33 are moved backwards. The directions of the helices still must be parallel to each other at points 30, 31, 32, 33, respectively, and perpendicular to radial line 16—17. In this view, therefore, the helices at the upper and lower end of the outside surface diverge from each other from front to rear, and the helices at the upper and lower end of the inside surface converge toward each other from front to rear.

This clearly illustrates that the surface inclination, or pressure angle of the relieved side surfaces, with respect to the dummy head, changes from front to rear. On the outside surface it increases from front to rear, and on the inside surface it is reduced from front to rear.

It is evident that this required change of inclination from front to rear could not be attained by simple rotation of the dummy head, in engagement with a grinding wheel. It is obtained however with the correcting motion of the present invention.

Thus, as illustrated in Fig. 8, when the grinding wheel 20 is moved axially during the relief-grinding of a side of a blade, a varying pressure angle from front to rear is produced on the blade. By properly selecting this correcting motion, then, the tilt of the blade in the dummy head will be compensated for, and a blade produced whose side surfaces will have pressure angles that are substantially constant when the blade is mounted in the actual cutting head. Two positions of the grinding wheel are denoted at 20 and 20', respectively. It will be seen that in the full line position 20, the grinding wheel will produce a profile 40 on the outside surface of the blade which has a different inclination or pressure angle from the profile 40' produced on the same side of the blade when the grinding wheel is in the dotted line position shown at 20'. Fig. 8 illustrates the operation only when grinding the outside surface of the blade, but it will be obvious that the same principle applies when grinding the inside surface of the blade.

Fig. 6 illustrates on a somewhat enlarged scale and in a somewhat exaggerated way, the variation in pressure angle from front to rear, measured in the dummy head, that is produced on the side surfaces as ground with the correcting motion of the present invention. The amount of change in pressure angle of the outside and inside surfaces of the tilted blade is such that when the blade is mounted erect in its own head, as shown in Fig. 5, both outside and inside surfaces of the blade will have a substantially constant inclination to the axis 11 of the cutter head from front to rear of the blade surface.

The correcting motion removes little stock, much less than a relieving motion would. It is therefore possible to obtain an excellent finish on the side surfaces of the blades with the correcting motion. The correcting motion is independent of the grinding wheel diameter. Large diameter wheels and small diameter wheels require the same motion on the same blades. In principle, the side surfaces produced on the blades by the method of the present invention is an approximation. However, the mathematical error is so small as to be negligible.

Various means may be employed for producing the reciprocating correcting motion. Thus, as illustrated diagrammatically in Fig. 2, with respect to the outside grinding wheel 20, the correcting motion may be effected by a cam 45 whose axis 46 intersects the axis 22 of the grinding wheel. This cam is mounted to bear against an abutment member 47 having a plane abutting face 48 and an arcuate lower face 49. The lower face 49 seats in an arcuate seat 50, so that the angularity of the abutment member may be adjusted. Through this adjustment, the throw of the cam can be changed. This reduces the number of cams that may be required for grinding a range of work. The abutment member may be secured in any suitable manner to the wheel spindle 52. The cam 45 is driven in timed relation with the rotation of the dummy head to effect the reciprocation of the grinding wheel once for each blade to be ground. The inside grinding wheel 21 may be reciprocated through a similar mechanism.

Adjustment of the grinding wheel 20 for pressure angle may be made about the axis 46 of the cam 45. On spherical cutters, the correcting motion has about the same throw as the conventional axial relieving motion would have. The more curved a blade profile is, however, the less correcting motion is required. In other words, the correcting motion increases with increasing radius of profile curvature. Reversal of profile curvature calls for a reversal of the direction of the correcting motion.

As already stated, only one dummy head is required per cutter diameter, and the diameter of the dummy head is increased over the diameter of the cutter head so that all blades of a cutter may be ground in a single setup and in a single operation. This will be clear from Figs. 2 and 3. 55 denotes a mean line of grinding contact between the wheel 20 and the outside surface 18 of one of the blades. In relief-grinding the outside surface of a blade, the line of contact must pass across the whole effective side surface of the blade from front to rear, that is, must sweep out the area between the line 55′ and the line 55″. The line 55a denotes the position where grinding contact must begin for the next succeeding blade. In the distance 55″—55a, which is denoted on the drawings at $b$, the grinding wheel must be reversed to first withdraw it to initial position ready to grind the next blade. This distance $b$ is equal to about a quarter of the distance $a$, which is the total distance required for grinding and the return movement. Thus about 90° of the active surface of the cam 45 may be employed for the reversal and return movements of the grinding wheel. This is sufficient for even fast operation.

The same efficiency is possible in the grinding of the inside surface of the blade, as shown in Fig. 3. Here $b'$ denotes the distance required for reversal and return, and $a'$ the total movement in the cycle of relieving one blade.

Figures 1, 2:
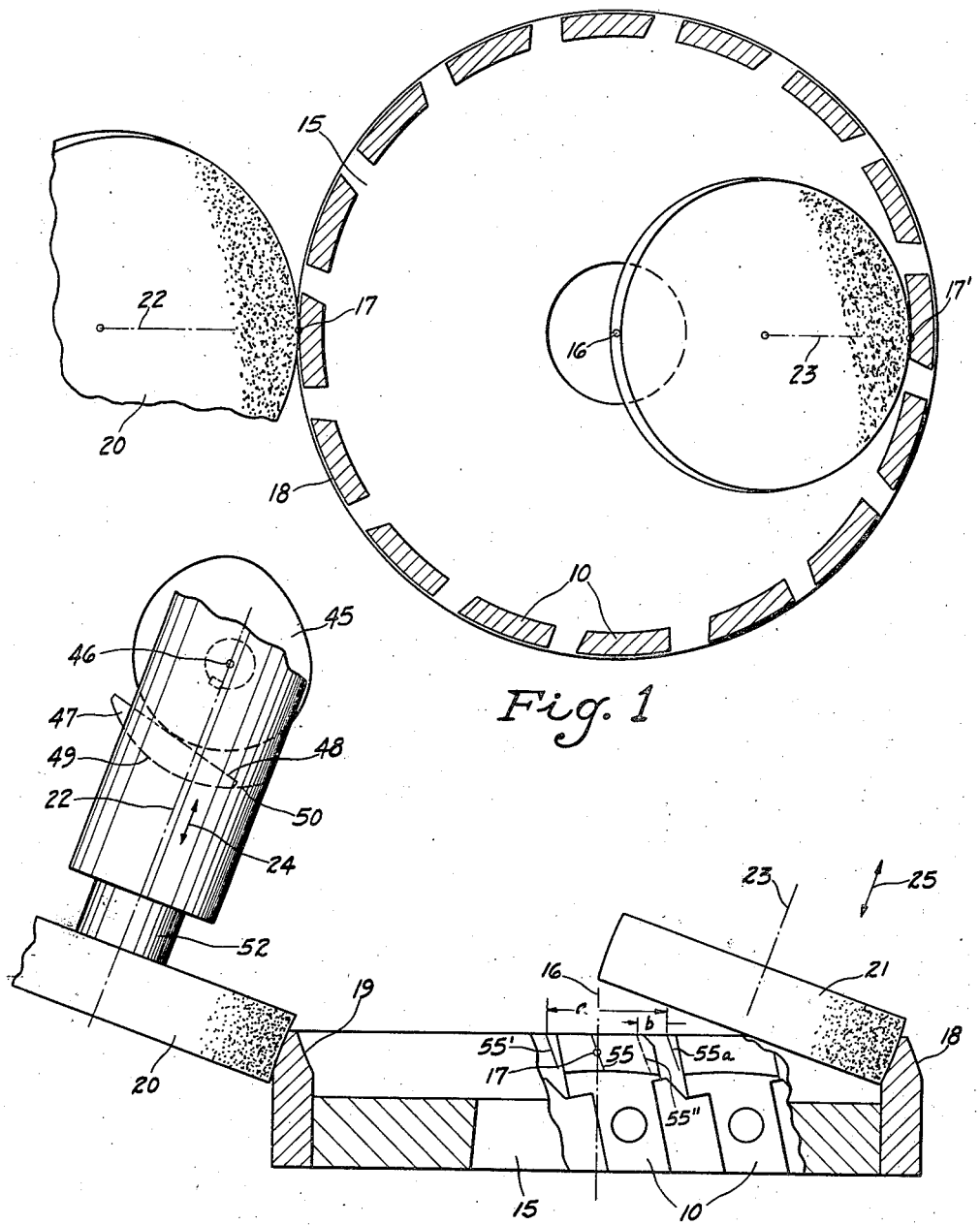
Fig. 1 is a part plan, part sectional view in a plane perpendicular to the axis of the dummy head, and diagrammatically illustrating the process of the present invention.
Fig. 2 is a part elevational, part sectional view in an axial plane of the dummy head, further illustrating the process of the present invention.

With the arrangement shown in Figs. 1 and 2, all of the blades of a cutter having all outside blades may be relief-ground simultaneously. Fig. 3 shows the setup for grinding the blades of a cutter having all inside blades. When the side surface of one blade is being ground, the wheel does not interfere with the adjacent blade because the blade surfaces lie very nearly in a surface of revolution. They stand out from a common surface of revolution only at the corners of the blades and not much even there. Clearance conditions are still more favorable where alternate inside and outside blades are being ground simultaneously. These can be ground in a head having blade slots all of the same depth by using shims under the inside blades. If desired, however, a separate head having alternate blade slots of different depths may be provided.

The tops of the blades both outside and inside, may be ground as plane surfaces according to known practice.

While the invention has been described in connection with the relief-grinding of blades of curved profile, particularly blades for a spherical cutter, it will be understood that it is applicable to the grinding of any blades whose profiles have different inclinations at different portions of their height. Thus, it may be employed for the grinding of double pressure angle blades of the "Toprem" type. Each grinding wheel is then dressed to a profile having two pressure angles corresponding to the two pressure angles which it is desired to produce on the blades. While the invention has been described in connection with a particular embodiment thereof, then, it will be understood that it is capable of further modification and use, and this application is intended to cover any variations, uses, or adaptations of the invention, following, in general, the principles of the invention and including such departures from the present disclosure as come within known or customary practice in the art and as may be applied to the essential features hereinbefore set forth and as fall within the scope of the invention or the limits of the appended claims.

Having thus described my invention, what I claim is:

1. The method of relief-grinding the side surfaces of a face-mill gear cutter blade which has a profile of different inclination to the axis of the cutter at different points in the blade height, which comprises mounting the blade to be ground in a rotary head so that it is tipped forwardly out of cutting position, mounting a grinding wheel, that has a profile shape of different inclination to the axis of the wheel at different points in height of said profile in conformity to the profile shape to be ground on the blade, in operative relation with the blade surface to be ground, and rotating the wheel and head on their respective axes while moving the wheel axially in time with the rotation of the head.

2. The method of relief-grinding side surfaces of face-mill gear cutter blades whose profiles are of different inclinations to the axis of the cutter at different points in the blade height, which comprises mounting the blades to be ground in a rotary head so that they are tipped forwardly out of cutting position by the amount of top clearance angle of the blades, mounting a grinding wheel, that has a profile shape of different inclination to the axis of the wheel at different points in the height of said profile in conformity to the profile shape to be ground on the blade, in operative relation with the blade, and rotating the wheel and head on their respective axes while effecting a relative reciprocatory movement between the wheel and head in a direction axial of the the wheel in time with the head rotation and once per blade to be relieved.

3. The method of relief-grinding side surfaces of blades of a spherical face-mill gear cutter which comprises mounting the blades in a rotary head so that they are tipped forwardly out of cutting position by the amount of top clearance angle of the blades, mounting a grinding wheel, that has a circular arcuate profile shape in an axial plane, in operative engagement with the blades, and rotating the wheel and head on their respective axes while effecting a relative reciprocatory movement between the wheel and head axially of the wheel, once for each blade to be relieved.

4. The method of relief-grinding the side surfaces of blades of a spherical face-mill gear cutter which comprises grinding the outside surfaces of the blades with a grinding wheel of concave circular arcuate profile shape in an axial plane, and grinding the inside surfaces of the blade with a grinding wheel of convex circular arcuate profile shape in an axial plane, by mounting the blades in a rotary head so that they are tipped forwardly out of cutting position by the amount of top clearance angle of the blade, and rotating the wheels and head on their respective axes, while reciprocating each wheel in the direction of its axis in time with the head rotation and once for each blade to be relieved.

5. The method of relief-grinding side surfaces of blades of a face-mill gear cutter which comprises mounting the blades to be relieved so that they are tipped forwardly out of cutting position by the amount of top clearance angle of the blades, mounting a grinding wheel, that is of circular arcuate profile in an axial plane, in engagement with a blade so that it contacts with the blade along a line extending from top to bottom of the wheel profile and so that the axis of the wheel lies in the same plane with the axis of the head and rotating the wheel and head on their respective axes while reciprocating the wheel in the direction of its axis in time with the rotation of the head and once for each blade to be relieved.

6. The method of relief-grinding a side surface of a face-mill gear cutter blade which comprises mounting the blade in a rotary head so that the blade is tipped forwardly out of cutting position by the amount of top clearance angle of the blade, engaging a grinding wheel, that has a profile in an axial plane of different inclination to the axis of the wheel at different points in the height of the profile, with the blade so that the wheel contacts with the blade along a line extending from top to bottom of the wheel profile and the wheel axis lies in the same plane with the axis of the rotary head, and rotating the wheel and head on their respective axes while moving the wheel axially in such timed relation to the rotation of the head that a side surface is ground on the blade of approximately the same pressure angle from front to rear when the blade is mounted in its own cutting head.

7. The method of relief-grinding the side surfaces of a face-mill gear cutter blade which has a profile of different inclination to the axis of the cutter at different points in the blade height, which comprises mounting the blade to be ground in a rotary head so that it is tipped forwardly out of cutting position, mounting a grinding wheel, that has a profile shape of different inclination to the axis of the wheel at different points in the height of the wheel profile in conformity to the profile shape to be ground on the blade, in operative relation with the blade surface to be ground, with the axes of the wheel and head in the same plane and rotating the wheel and head on their respective axes while producing a relative movement between wheel and head in a direction inclined to the head axis.

8. The method of relief-grinding side surfaces of blades of a spherical face-mill gear cutter which comprises mounting the blades in a rotary head so that they are tipped forwardly out of cutting position by the amount of top clearance angle of the blades, so that the tip surfaces of the blades all lie in a plane perpendicular to the axis of said head mounting a grinding wheel, that has a circular arcuate shape in an axial plane, in operative engagement with the blades, and rotating the wheel and head on their respective axes while effecting a relative reciprocatory movement between the wheel and head in a direction inclined to the axis of the head once for each blade to be relieved.

ERNEST WILDHABER.